United States Patent
Kostjukovs et al.

(10) Patent No.: US 10,638,761 B2
(45) Date of Patent: May 5, 2020

(54) METAL FREE ANTIMICROBIAL AND UV PROTECTION ADDITIVE

(71) Applicant: ALINA, SIA, Riga (LV)

(72) Inventors: Juris Kostjukovs, Riga (LV); Julija Karasa, Riga (LV); Solvita Kostjukova, Jurmala (LV)

(73) Assignee: ALINA, SIA, Riga (LV)

( * ) Notice: Subject to any disclaimer, the term of this patent is extended or adjusted under 35 U.S.C. 154(b) by 0 days.

(21) Appl. No.: 16/477,071

(22) PCT Filed: Jan. 12, 2017

(86) PCT No.: PCT/IB2017/050159
§ 371 (c)(1),
(2) Date: Jul. 10, 2019

(87) PCT Pub. No.: WO2018/130880
PCT Pub. Date: Jul. 19, 2018

(65) Prior Publication Data
US 2019/0357540 A1    Nov. 28, 2019

(30) Foreign Application Priority Data
Jan. 10, 2017  (LV) .................................. P-17-02

(51) Int. Cl.
*A01N 59/06* (2006.01)
*A01N 33/12* (2006.01)
*C09D 5/14* (2006.01)

(52) U.S. Cl.
CPC ............. *A01N 59/06* (2013.01); *A01N 33/12* (2013.01); *C09D 5/14* (2013.01)

(58) Field of Classification Search
CPC ........ A01N 25/08; A01N 25/34; A01N 33/12; A01N 59/06; C09D 5/14; C09D 7/48; C09D 7/62; C11D 3/1266; C11D 3/1253
See application file for complete search history.

(56) References Cited

U.S. PATENT DOCUMENTS

| | | |
|---|---|---|
| 5,718,841 A | 2/1998 | Mardis et al. |
| 5,939,475 A | 8/1999 | Reynolds et al. |
| 6,165,485 A | 12/2000 | Alther |
| 9,228,121 B2 * | 1/2016 | de Oliveira Filho .. A01N 33/04 |
| 2013/0004544 A1 * | 1/2013 | Metge .................... A01N 59/16 424/400 |
| 2017/0095508 A1 * | 4/2017 | Hagen .................... A61K 33/06 |

FOREIGN PATENT DOCUMENTS

| | | |
|---|---|---|
| RU | 2448923 C1 | 4/2012 |
| WO | 2009148986 A2 | 12/2009 |
| WO | 2013098774 A1 | 7/2013 |

OTHER PUBLICATIONS

ISR PCT/IB2017/050159, dated Sep. 21, 2017, 2 pages.

* cited by examiner

*Primary Examiner* — Anthony J Green
(74) *Attorney, Agent, or Firm* — Brooks Kushman P.C.

(57) ABSTRACT

Metal free antimicrobial and UV protection additives, which can be used in building or finishing materials, such as plasters, mortars, primers, paints and other protective or decorative coatings to eliminate growth of bacteria, fungi, algae and lichen and to protect material from ultraviolet (UV) radiation. The additive having mixed organophilic layer illite-smectite, chlorite, illite, carbonates, silica and hematite with the following ratio of the components (weight %): mixed layer organophilic illite-smectite from 40 to 70%; chlorite from 5 to 10%; illite from 5 to 10%; carbonates from 0 to 20%; silica from 5 to 20%; hematite from 0 to 3%. The mixed layer illite-smectite is organophilized with quaternary ammonium compounds used in the amount from 10 to 30% counting from the required weight of the mixed layer organophilic illite-smectite.

9 Claims, 2 Drawing Sheets

METAL FREE ANTIMICROBIAL AND UV PROTECTION ADDITIVE

CROSS-REFERENCE TO RELATED APPLICATION

This application is the U.S. national phase of PCT Application No. PCT/IB2017/050159 filed on Jan. 12, 2017, which claims priority to LV Patent Application No. P-17-02 filed on Jan. 10, 2017, the disclosures of which are incorporated in their entirety by reference herein.

FIELD OF THE INVENTION

The invention relates to metal free antimicrobial and UV protection additives, which can be used in building or finishing materials, such as plasters, mortars, primers, paints and other protective or decorative coatings to eliminate growth of bacteria, fungi, algae and lichen and to protect material from ultraviolet (UV) radiation.

PRIOR ART

There are known several organophillic clay compositions used to provide improved rheological properties of paints, inks and coatings.

For instance, there are known organoclay compositions manufactured with organic acid derived ester quaternary ammonium compounds, which can be used in a non-aqueous fluid systems such as paints, inks, and coatings to provide improved rheological properties (U.S. Pat. No. 5,718,841). The known organophilic clay composition comprises the reaction product of: a smectite-type clay having a cation exchange capacity of at least 75 milliequivalents per 100 grams of clay; and a quaternary ammonium compound derived from an organic acid-derived ester in an amount sufficient to satisfy at least about 75% of the cation exchange capacity of the smectite-type clay.

There is known pourable organophilic clay polyamide composition (U.S. Pat. No. 5,939,475), which may be used in non-aqueous fluid systems such as paints, inks, and coatings to provide improved rheological properties to the system. The composition comprising from 5 to 15 wt. % of an organophilicly modified smectite-type clay; from 25 to 35 wt. % of one or more rheologically active polyamides and from 40 to 60 wt. % of one or more organic solvents, such as n-propanol, toluene and mineral spirits.

There is known a biocidal organoclay (U.S. Pat. No. 6,165,485), which is obtained by mixing of a bentonite based organoclay with a biocidal quaternary amine containing a benzyl molecule within its structure. It is disclosed that when this organoclay is further treated with iodine and iodide compounds, its efficiency is enhanced.

The main disadvantages of the known compositions as additives to plasters, mortars, primers, paints and other protective or decorative coatings are that these compositions do not provide simultaneous antimicrobial and UV protection features or are intended to be used only in aqueous or non-aqueous media.

There is known a number of antimicrobial additives for paints, cement and other materials comprising a metal, e.g. silver, zinc, copper and copper sulphate (WO 2013098774). The disadvantages of the additives containing zinc and copper are that they are not environmentally friendly, where the additives containing silver are too expensive to be used in construction materials.

DISCLOSURE OF THE INVENTION

The proposed metal free antimicrobial and UV protection additive comprising mixed layer illite-smectite, chlorite, illite, carbonates, silica and hematite. The additive contains the following ratio of the components, weight %: mixed layer organophilic illite-smectite from 40 to 70%; chlorite from 5 to 10%; illite from 5 to 10%; carbonates from 0 to 20%; silica from 5 to 20%; hematite from 0 to 3%. Said mixed layer illite-smectite in advance is organophilized with quaternary ammonium compounds used in the amount from 10 to 30% counting from the required weight of the mixed layer illite-smectite.

The quaternary ammonium compound is selected from the group consisting of: monomethyl, dimethyl, trimethyl substituted quaternary ammonium salts. Substitutions are aliphatic or aromatic (including aralkyl) groups. According to the preferred embodiment the quaternary ammonium compound is at least with one long aliphatic chain having 8 to 18 carbon atoms. The quaternary ammonium compound is preferably selected from the group of halides consisting of chloride or bromide.

The carbonates are preferably selected from the group consisting of calcite and dolomite.

There is also proposed a building or finishing material, such as plaster, mortar, primer, paint, protective or decorative coating comprising said antimicrobial and UV protection additive in a proportion (mass mixing ratio) building or finishing material: the antimicrobial additive—from 1:500 to 1:5.

Figure 1:
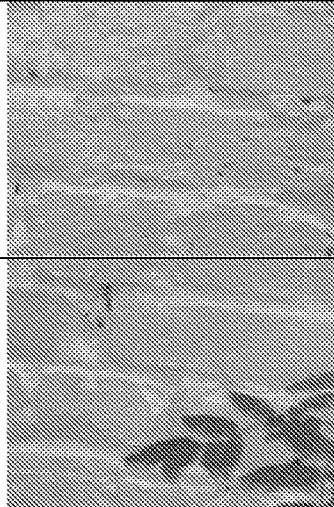
FIG. 1 shows pictures of two wall fragments coated with paint containing the offered additive and the same paint without the additive; the pictures show dynamics of algae growth on the surface coated with paint without the additive and lack of algae on the surface coated with paint with the additive.

The claimed metal free antimicrobial and UV protection additive can be obtained e.g. by known mechanochemical methods.

EXAMPLES OF IMPLEMENTATION OF THE INVENTION

The invention is further explained by the following examples, where some of possible embodiments of the proposed additive are described with abbreviation "P1/$C_{1-10}$", where P1-P7 is composition mixture having proportions from Table 1 and "$C_{1-10}$" (and other)—examples of the quaternary ammonium compounds, having proportions from the Table 2.

TABLE 1

Components of the antimicrobial additive (weight %)

| Abbreviation | Organophilic mixed layer illite-smectite, | Chlorite | Illite | Carbonate | Silica | Hematite |
|---|---|---|---|---|---|---|
| P1 | 49 | 5 | 5 | 20 | 20 | 1 |
| P2 | 60 | 10 | 11 | 0 | 19 | 0 |

TABLE 1-continued

Components of the antimicrobial additive (weight %)

| Abbreviation | Organophilic mixed layer illite-smectite, | Chlorite | Illite | Carbonate | Silica | Hematite |
|---|---|---|---|---|---|---|
| P3 | 70 | 6 | 7 | 10 | 5 | 2 |
| P4 | 50 | 10 | 10 | 12 | 15 | 3 |
| P5 | 40 | 8 | 10 | 20 | 20 | 2 |
| P6 | 58 | 7 | 9 | 15 | 8 | 3 |
| P7 | 67 | 9 | 6 | 5 | 10 | 3 |

TABLE 2

Onium group compounds and weight % used in organophilic mixed layer illite-smectite in the examples (the weight % are calculated counting from the required weight of the organophilic mixed layer illite-smectite):

| Abbreviation | CAS No | Weight % |
|---|---|---|
| $C_{1-10}$ | 112-03-8 | 10 |
| $C_{1-15}$ | 112-03-8 | 15 |
| $C_{1-23}$ | 112-03-8 | 23 |
| $C_{1-30}$ | 112-03-8 | 30 |
| $C_{2-11}$ | 57-09-0 | 11 |
| $C_{2-18}$ | 57-09-0 | 18 |
| $C_{3-11}$ | 7173-51-5 | 11 |
| $C_{3-18}$ | 7173-51-5 | 18 |
| $C_{4-10}$ | 68424-85-1 | 10 |
| $C_{4-22}$ | 68424-85-1 | 22 |
| $C_{5-13}$ | 18262-86-7 | 13 |
| $C_{5-19}$ | 18262-86-7 | 19 |
| $C_{6-10}$ | 25988-97-0 | 10 |
| $C_{6-15}$ | 25988-97-0 | 15 |

Example 1—Antifungal Properties

For the determination of antifungal activity of the additive material, fungal strains *Cladosporium herbarum* MSCL 258 *Alternaria brassicicola* MSCL 260 were used. Fungi were cultivated on Malt Extract agar (Becton & Dickinson, USA) at 22° C. for 48 h. Powder of the additive in amount of 0.05 or 0.5 g was weighted and placed in Petri plates. Liquefied Malt Extract Agar in amount of 25 ml was added and carefully mixed with the powder. This led to a 0.2% or 2.0% powder concentration in the medium. After solidification of media, suspension of fungal culture of turbidity OD540=0.16±0.02 was uniformly spread on Petri plates. The antifungal activity was evaluated based on the inhibition of fungal growth after incubation at 22° C. for 4 days and expressed using a four-point scale. Results are listed in the Table 3 and Table 4.

TABLE 3

Antifungal activity of the additive variations $P2/C_{2-11}$ and $P1/C_{1-23}$

| Samples - additive powder variations | $P2/C_{2-11}$ | $P1/C_{1-23}$ |
|---|---|---|
| Control - 0.0% powder | 4 | 4 |
| 0.2% powder | 2 | 2 |
| 2.0% powder | 2 | 2 |

1—Growth is not observed.
2—Only a few small colonies.
3—Fungi cover the entire surface of the medium; the medium is transparent only in certain places.
4—Fungi cover the entire surface of the medium.

The results obtained show that the proposed antimicrobial and UV protection additive (powder) in concentration of 0.2% and 2.0% equally inhibit the growth of fungi.

TABLE 4

Antifungal activity of the additive (variations)

| Samples - additive powder variations | $P1/C_{3-18}$ | $P5/C_{4-10}$ | $P6/C_{5-13}$* | $P4/C_{6-15}$ |
|---|---|---|---|---|
| *Cladosporium herbarum* | | | | |
| Control - 0.0% powder | 4 | 4 | 4 | 4 |
| 0.2% powder | 2 | 0 | 3 | 4 |
| 2.0% powder | 0 | 0 | 3 | 1 |
| *Alternaria brassicicola* | | | | |
| Control - 0.0% powder | 4 | 4 | 4 | 4 |
| 0.2% powder | 0 | 0 | 3 | 4 |
| 2.0% powder | 0 | 0 | 3 | 2 |

1—Growth is not observed
2—Only a few small colonies
3—Fungi cover the entire surface of the medium, the medium is transparent only in certain places
4—Fungi cover the entire surface of the medium
*Powder was very hydrophobic and it could not be uniformly suspended in the medium The results obtained show that $P6/C_{5-13}$ and $P4/C_{6-15}$ in concentration of 0.2% and 2.0% only partially inhibit the growth of fungi. $P1/C_{3-18}$ completely inhibited *Alternaria brassicicola* in both concentrations, but partially inhibited *Cladosporium herbarum* in 0.2% concentration. $P5/C_{4-10}$ completely inhibited growth of both fungi in both concentrations.

Example 2—Antibacterial Properties

For the determination of antibacterial activity of powder of the tested antimicrobial additive, bacterial strains *Pseudomonas aeruginosa* MSCL 331 and *Staphylococcus aureus* MSCL 334 were used. Bacteria were cultivated on Plate Count Agar (Bio-Rad, France) at 37° C. for 24 h. The additive powder samples in amount of 0.05 or 0.5 g was weighted and placed in Petri plates. Liquefied Mueller-Hinton Agar in amount of 25 ml was added and carefully mixed with the powder. This led to a 0.2% or 2.0% powder concentration in the medium. After solidification of media, suspension of bacterial culture of turbidity OD540=0.16±0.02 was used and uniformly spread on Petri plates. The antibacterial activity was evaluated based on the inhibition of bacterial growth after incubation at 37° C. for 2 days and expressed using a four-point scale. Results are listed in the Table 5.

TABLE 5

Antibacterial activity

| Samples - additive powder variations | $P6/C_{3-11}$ | $P4/C_{4-22}$ | $P1/C_{5-19}$* | $P7/C_{6-10}$ |
|---|---|---|---|---|
| *Pseudomonas aeruginosa* | | | | |
| Control - 0.0% powder | 4 | 4 | 4 | 4 |
| 0.2% powder | 1 | 0 | 0 | 2 |
| 2.0% powder | 0 | 0 | 0 | 0 |
| *Staphylococcus aureus* | | | | |
| Control - 0.0% powder | 4 | 4 | 4 | 4 |
| 0.2% powder | 1 | 1 | 0 | 3 |
| 2.0% powder | 0 | 0 | 0 | 2 |

1—Growth is not observed
2—Only a few small colonies
3—Bacterial colonies cover the entire surface of the medium, the medium is transparent only in certain places
4—Bacteria cover the entire surface of the medium The obtained results show that all the proposed additives inhibit the growth of bacteria. Complete inhibition was observed in case of 0.2% concentration of $P1/C_{5-19}$ and in case of 2.0% concentration also of $P6/C_{3-11}$ and $P4/C_{4-22}$.

Example 3—Antifungal Properties in Non-Aqueous System—Linseed Oil Pernica

For the determination of antifungal activity of the proposed antimicrobial and UV protection additive to protect linseed oil pernica, fungal strain *Cladosporium herbarum* MSCL 258 was used. Fungi were cultivated on Malt Extract Agar (Becton & Dickinson, USA) at 22° C. for 48 h. Suspension of fungal culture of turbidity OD540=0.16±0.02 was spread on plywood samples placed in sterile Petri plates. The antifungal activity was evaluated based on the inhibition of fungal growth after incubation at 22° C. for 7 days and expressed using a four-point scale. Results are listed in the Table 6.

TABLE 6

Antifungal activity of plywood samples ($P5/C_{1-15}$)

| Samples | Fungal growth |
| --- | --- |
| Control - untreated plywood | 3 |
| Linseed oil without the proposed antimicrobial additive | 2 |
| Linseed oil with 2% of the proposed antimicrobial additive | 2 |
| Linseed oil with 3% of the proposed antimicrobial additive | 1 |
| Linseed oil with 5% of the proposed antimicrobial additive | 0 |
| Linseed oil with 7% of the proposed antimicrobial additive | 0 |
| Linseed oil with 10% of the proposed antimicrobial additive | 0 |

0—Growth is not observed
1—Only a few small colonies
2—Fungi cover surface of the medium, the medium is transparent only in certain places
3—Fungi cover the entire surface of the medium The obtained results show that linseed oil with the proposed antimicrobial and UV protection additive in concentration of 5-10% completely inhibit the growth of fungi on plywood samples.

Example 4—Antifungal Properties in Aqueous System—Cement-Lime Base Building Materials For the determination of antifungal activity of the proposed antimicrobial and UV protection additive when mixed into cement-lime base mortar and lime base paint, the additive was mixed with proportion of 0% and 2% of mass of the dry part of mortar and paint and compared different combinations described in Table 7. For determination of antifungal activity the fungal strains *Cladosporium herbarum* MSCL 258 and *Alternaria brassicicola* MSCL 260 were used. Fungi were cultivated on Malt Extract Agar (Becton & Dickinson, USA) at 22° C. for 48 h. Suspension of fungal culture of turbidity OD540=0.16±0.02 was used and uniformly spread on Petri plates with Malt Extract Agar. Tested materials were placed on the surface of inoculated Petri plates. The antifungal activity was evaluated based on the size of zone of inhibition around tested materials after incubation at 22° C. for 2-7 days. Results were expressed in three-point scare. Results are listed in the Table 7.

TABLE 7

Antifungal activity of the samples.

| Fungi | Mortar without the additive Without paint | Mortar with the additive $P3/C_{1-10}$ Without paint | Mortar without the additive Paint without the additive | Mortar without the additive Paint with the additive $P5/C_{1-30}$ | Mortar with the additive $P3/C_{1-10}$ Paint without the additive | Mortar with the additive $P3/C_{1-10}$ Paint with the additive $P5/C_{1-30}$ |
| --- | --- | --- | --- | --- | --- | --- |
| *Cladosporium herbarum* | 2 | 1 | 2 | 1 | 0 | 0 |
| *Alternaria brassicicola* | 2 | 1 | 2 | 1 | 0 | 0 |

0—Inhibition zone exceeded 1 mm
1—Inhibition zone did not exceed 1 mm
2—Inhibition zone was not observed The obtained results show that inhibition of fungal growth is caused by the proposed antimicrobial and UV protection additive both in the composition of the plaster and in the paint.

Example 5—Anti-Algae Properties in Aqueous System—Lime Base Building Materials Historical lime base paint without and with the introduced additive ($P4/C_{2-18}$) was painted on north side of non-renovated building without other treatments. After noticing the microbial material grow on the painted area without added additive, the microbial smear test showed that the microorganism is green algae *Chlorophyta*. The obtained results (FIG. 1) show that inhibition of algae growth is caused by the proposed additive.

Example 6—Wash-Out Test

There were ten consecutive cycles of testing run. In each cycle 20 gr of the antimicrobial additive ($P4/C_{1-23}$) was mixed into 1 liter of water, mixed for 4 h, dried for 24 h in 70° C. Measuring active substance wash-out after every 5 cycles—heating up to 450° C. and calculated % of the heated mass loss.

| | Cycle | | | | | | | | | | |
| --- | --- | --- | --- | --- | --- | --- | --- | --- | --- | --- | --- |
| | 0 | 1 | 2 | 3 | 4 | 5 | 6 | 7 | 8 | 9 | 10 |
| % of active substance | 11.5% | — | — | — | — | 11.5% | — | — | — | — | 11.5% |

The proposed antimicrobial and UV protection additive (encapsulated active organic substance) washout tendency after 10 cycles is observed less than 0.1% point.

Figure 2:
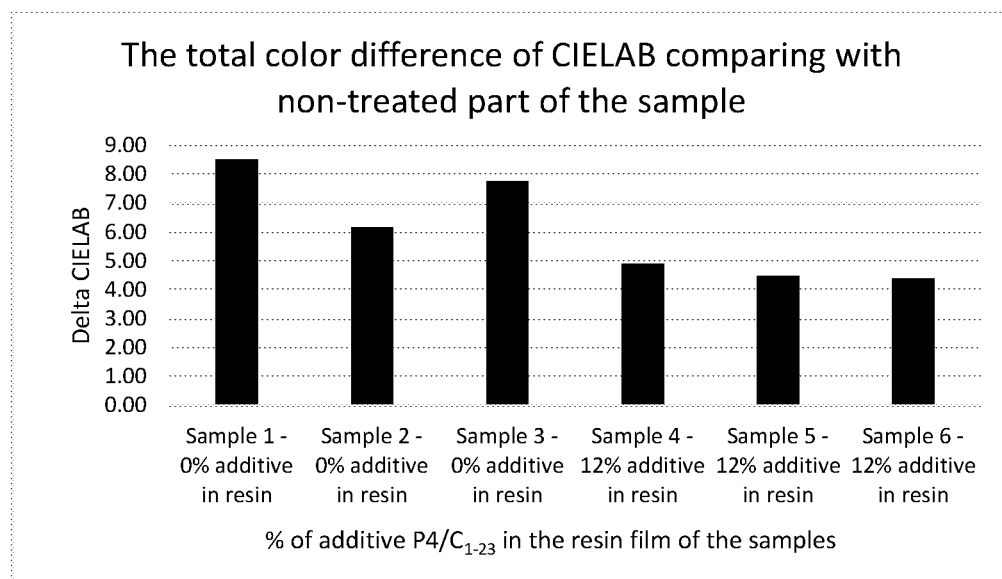
FIG. 2—a diagram showing column chart comparing value changes of damage caused by UV radiation; the column chart shows colour difference—delta CIELAB comparing samples with the offered additive in resin and the same resin without the additive.

Example 7—UV Protection Properties in Non-Aqueous System—Plywood Lamination Resin Film Fort the determination of UV protection properties of the additive a laminated resin film of a plywood with the offered additive in resin was treated with UV radiation and after was calculated the color difference from non-treated film of the plywood using CIELAB (or CIE L*a*b*, CIE Lab) standard test procedure. Dry powder of additive P4/$C_{1-23}$ was mixed in liquid lamination resin in proportions 0%, 12% and 20% of mass of the dry part or resins to prepare the lamination paper film. The offered additive in different proportions was mixed equally in the resin. The lamination paper was soaked into the resins containing different proportions of the offered additive, dried and after laminated on the plywood using hot-press method. The laminated resin films containing different proportions of offered additive did not differ by eyesight. After the lamination, the plywood samples containing 0% and 12% were chosen to determine the UV protection properties. The prepared samples were cut in two parts and one part of each sample was treated with UV line system that is used in plywood production process by treating the samples one hundred times with the UV system exposure. The UV protection properties were evaluated based on the calculated color difference (delta) using CIELAB procedure. To calculate each sample delta CIELAB the data was taken from twenty points and calculated average delta CIELAB of each sample that are shown in FIG. 2.

The obtained results show that the proposed additive in concentration of 12% improves resistance of resin film (pigment color) to damages caused by the UV radiation by improving the delta CIELAB coefficient (improving means smaller delta value) in average of 39%.

The claimed metal free antimicrobial and UV protection additive can be used in an aqueous system such as paints, plasters, mortars, inks, coatings and non-aqueous fluid system such as paints, resins, oil, inks, biopolymers, and other coatings in a proportion (mass mixing ratio) fluid system: the antimicrobial additive—from 1:500 to 1:5.

The presence of the claimed additive advantageously ensures UV protection properties of the respective aqueous or non-aqueous media and preserves coatings and building materials preventing growth of bacteria, fungi, algae and lichen.

Also the additive improves adhesion of materials and the colour surface quality, making it smoother. The coating comprising the additive is suitable for rinsing—retains physical and antimicrobial properties with water contact. 150 μm grind, helps an even mix with other raw materials. As a dry powder, it is convenient to use during material production and in the construction process. The additive is amenable for dry and wet grinding (≥5 μm) and dispersion in dry and wet mix. Up to about 170° C. heating does not affect physical and functional product characteristics.

Thus the claimed additive may help protecting initial properties and aesthetical look of the volume of surface or objects, i.a paints, plasters, mortars, plastics, resins, sealants, biocomposite adhesives and binders, papers, art works, masonry, composite materials, or other construction materials, including wood. The additive is non-hazardous, human health and environmentally friendly because of leaching resistant microstructure.

The invention claimed is:

1. An antimicrobial and UV protection additive comprising: mixed layer illite-smectite, chlorite, illite, carbonates, silica and hematite, wherein the additive contains the following ratio of the components, weight %:
    mixed layer illite-smectite from 40 to 70%,
    chlorite from 5 to 10%,
    illite from 5 to 10%,
    carbonates from 0 to 20%,
    silica from 5 to 20%,
    hematite from 0 to 3%,
    wherein the mixed layer illite-smectite in advance is organophilized with quaternary ammonium compounds used in the amount from 10 to 30 wt % based on the weight of the mixed layer illite-smectite.

2. The antimicrobial additive according to claim 1, wherein carbonates are selected from the group consisting of calcite and dolomite.

3. The antimicrobial additive according to claim 1, wherein the quaternary ammonium compound is selected from the group consisting of: monomethyl, dimethyl, and trimethyl substituted quaternary ammonium salts.

4. The antimicrobial additive according to claim 1, wherein the quaternary ammonium compound comprises at least one long aliphatic chain having 8 to 18 carbon atoms.

5. The antimicrobial additive according to claim 1, wherein the quaternary ammonium compound is selected from the group of halides consisting of chloride and bromide.

6. A building or finishing material comprising the antimicrobial and UV protection additive of claim 1 in a proportion (mass mixing ratio) building or finishing material:the additive—from 1:500 to 1:5.

7. The antimicrobial additive according to claim 2, wherein the quaternary ammonium compound is selected from the group consisting of: monomethyl, dimethyl, and trimethyl substituted quaternary ammonium salts.

8. The antimicrobial additive according to claim 2, wherein the quaternary ammonium compound comprises at least one long aliphatic chain having 8 to 18 carbon atoms.

9. The antimicrobial additive according to claim 2, wherein the quaternary ammonium compound is selected from the group of halides consisting of chloride and bromide.

* * * * *